Figure 1:
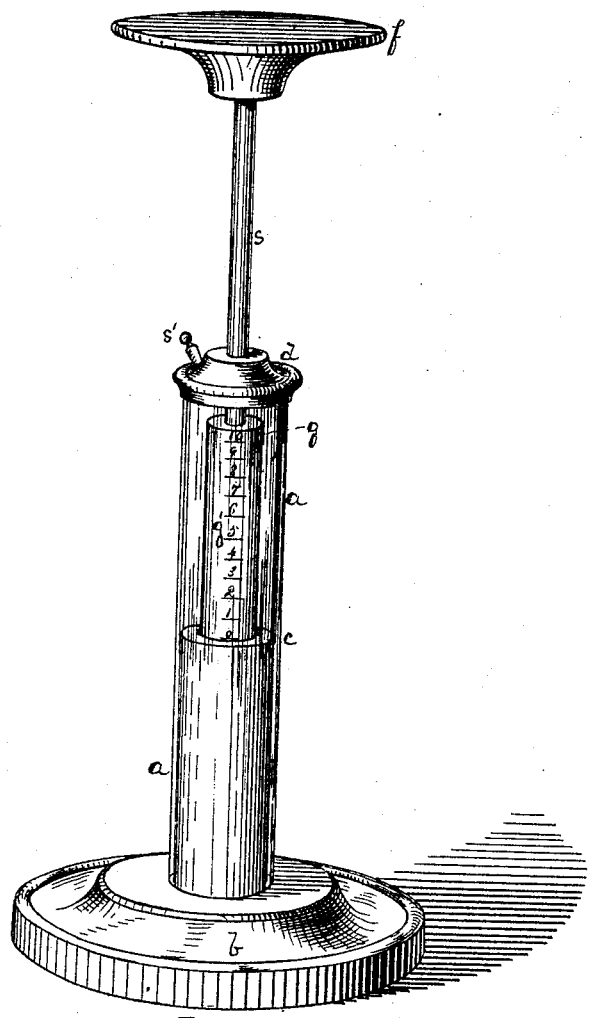

W. C. KING.
WEIGH-SCALES.

No. 171,670.           Patented Jan. 4, 1876.

UNITED STATES PATENT OFFICE.

WILLIAM C. KING, OF PITTSBURG, PENNSYLVANIA.

IMPROVEMENT IN WEIGH-SCALES.

Specification forming part of Letters Patent No. 171,670, dated January 4, 1876; application filed June 8, 1875.

*To all whom it may concern:*

Be it known that I, WILLIAM C. KING, of Pittsburg, county of Allegheny, State of Pennsylvania, have invented or discovered a new and useful Improvement in Weigh-Scales; and I do hereby declare the following to be a full, clear, concise, and exact description thereof, reference being had to the accompanying drawing making a part of this specification, in which—like letters indicating like parts—

Figure 1 shows my improvement in elevation.

My improved weighing-scale consists of a glass tube or cistern, containing, or intended to contain, mercury or other fluid body of a comparatively great specific gravity, a plunger or piston to displace a portion or all of the fluid, connected directly to a holder or receiver to contain the article or substance to be weighed, and an indicator on the plunger for making known, in a certain and readily-intelligible manner, the weight of the article by the amount or extent of displacement of the fluid, with radial guides for securing a direct motion to the plunger.

My improvement is shown in the drawing, wherein $a$ represents a transparent glass tube set in a pedestal, $b$, and filled with mercury to the level of $c$. The top of the tube $a$ is covered by a cap, $d$, through a central hole, in which the stem $s$ is guided in its motion up and down; but the parts should be made with reference to a minimum of friction at this point. The upper end of the stem $s$ carries a pan or receiver, $f$, on which is to be placed the substance or article to be weighed.

To the lower end of the stem I affix a plunger, $g$, on which is a graduated scale, $g'$, the zero or minimum weighing-line of which is at the level of the fluid when the instrument is not in use.

The form and sizes of the different parts, as well as the graduation of the scale, are to be regulated according to well-known laws, and hence need not be fully set forth.

Where great accuracy is required the scale should be adjustable, and to insure regularity of motion in the plunger its lower end should be guided by pins projecting radially therefrom against the sides of the tube, or by other like means.

The fluid body employed may be filled in and removed, as may be required, through a hole in the cap closed by a plug, $s'$.

With a graduated plunger inside a transparent glass cistern, the accuracy of the instrument will not be affected by slight changes in the level of the fluid, and in this respect the scale described, as a device for accurately ascertaining weights, possesses a material advantage over metallic cisterns with graduation elsewhere than on the plunger, this latter construction not being claimed herein.

I claim as my invention—

The weigh-scale described, consisting of a glass tube or cistern, $a$, a graduated plunger, $g$, connected by a stem with a holder or receiver, $f$, constructed substantially as and for the purposes set forth.

In testimony whereof I have hereunto set my hand.

WILLIAM C. KING.

Witnesses:
JNO. A. WILSON,
GEORGE H. CHRISTY.